(12) United States Patent
Kwon et al.

(10) Patent No.: US 10,135,057 B2
(45) Date of Patent: Nov. 20, 2018

(54) ELECTRODE ASSEMBLY AND SECONDARY BATTERY HAVING THE SAME

(71) Applicant: SAMSUNG SDI CO., LTD., Yongin-si, Gyeonggi-do (KR)

(72) Inventors: Jaeik Kwon, Yongin-si (KR); Kwangsoo Kim, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 723 days.

(21) Appl. No.: 14/645,989

(22) Filed: Mar. 12, 2015

(65) Prior Publication Data

US 2015/0364741 A1 Dec. 17, 2015

(30) Foreign Application Priority Data

Jun. 17, 2014 (KR) .................. 10-2014-0073648

(51) Int. Cl.
| | |
|---|---|
| *H01M 2/16* | (2006.01) |
| *H01M 2/30* | (2006.01) |
| *H01M 2/14* | (2006.01) |
| *H01M 2/26* | (2006.01) |
| *H01M 10/058* | (2010.01) |
| *H01M 10/052* | (2010.01) |

(52) U.S. Cl.
CPC ............ *H01M 2/266* (2013.01); *H01M 2/14* (2013.01); *H01M 2/1673* (2013.01); *H01M 10/052* (2013.01); *H01M 10/058* (2013.01)

(58) Field of Classification Search
None
See application file for complete search history.

(56) References Cited

U.S. PATENT DOCUMENTS

2013/0252080 A1* 9/2013 Naganawa ............ H01M 2/22
 429/179
2014/0045052 A1* 2/2014 Kim .................. H01M 10/0422
 429/186

FOREIGN PATENT DOCUMENTS

| KR | 10-2007-0047651 A | | 5/2007 |
| KR | 20070047651 A | * | 5/2007 |
| KR | 10-2008-0022914 A | | 3/2008 |
| KR | 20080022914 A | * | 3/2008 |

* cited by examiner

*Primary Examiner* — Daniel S Gatewood
(74) *Attorney, Agent, or Firm* — Lee & Morse, P.C.

(57) ABSTRACT

An electrode assembly includes a first electrode plate having a first electrode active material coated on at least one surface thereof, a second electrode plate having a second electrode active material coated on at least one surface thereof, a separator between the first electrode plate and the second electrode plate, and at least one support member between the first electrode plate and the separator and outwardly protruding farther than an outermost end of the separator. A secondary battery includes the electrode assembly.

18 Claims, 9 Drawing Sheets

ELECTRODE ASSEMBLY AND SECONDARY BATTERY HAVING THE SAME

CROSS-REFERENCE TO RELATED APPLICATION

Korean Patent Application No. 10-2014-0073648, filed on Jun. 17, 2014, in the Korean Intellectual Property Office, and entitled: "Electrode Assembly and Secondary Battery Having the Same," is incorporated by reference herein in its entirety.

BACKGROUND

1. Field

Embodiments relate to an electrode assembly and a secondary battery having the same.

2. Description of the Related Art

A secondary battery is a power storage system that converts electric energy into chemical energy and stores the converted energy to provide high energy density. Unlike primary batteries that cannot be recharged, a secondary battery is rechargeable. and is being widely used in IT devices, such as a cellular phone, a notebook computer, or a tablet PC. In recent years, electric vehicles are drawing attention owing to the rise in the oil price and a trend toward the use of secondary batteries as batteries for electric vehicles is growing.

SUMMARY

Embodiments are directed to an electrode assembly including a first electrode plate having a first electrode active material coated on at least one surface thereof, a second electrode plate having a second electrode active material coated on at least one surface thereof, a separator between the first electrode plate and the second electrode plate, and at least one support member between the first electrode plate and the separator and outwardly protruding farther than an outermost end of the separator.

The electrode assembly may further include a plurality of lead tabs drawn in a same direction from the first electrode plate and the second electrode plate, respectively.

When the electrode assembly is housed in a case, the support member may contact an internal surface of the case and support the first electrode plate, the second electrode plate and the separator while separating the first electrode plate, the second electrode plate and the separator from the case by a predetermined distance.

The support member may have a porous structure that allows mobile ions to move.

At least one surface of the support member may include an adhesive tape adhered thereto. The adhesive tape may be a porous tape allowing circulating ions to move.

The support member may have a bar shape.

The electrode assembly may further include a prop member protruding perpendicular to the support member from one end of the support member.

The support member may have an area that gradually increases toward its protruding direction.

Embodiments are also directed to a secondary battery including an electrode assembly including a first electrode plate, a second electrode plate, a separator between the first electrode plate and the second electrode plate and at least one support member between the first electrode plate and the separator, a case accommodating the electrode assembly, and electrode terminals electrically connected to the electrode assembly. One end of the support member outwardly protrudes from an outermost end of the separator and contacts an internal surface of the case.

The secondary battery may further include a plurality of lead tabs drawn in a same direction from the first electrode plate and the second electrode plate and electrically connected to the electrode terminals, respectively.

Directions of axes formed by the electrode terminals and the lead tabs may be parallel with a core axis direction of the electrode assembly.

The electrode assembly may include a plurality of electrode assemblies. The lead tabs drawn from the plurality of electrode assemblies may be arranged to face each other and may include bent portions facing each other. The bent portions may be electrically connected to the electrode terminals.

The support member may support the first electrode plate, the second electrode plate and the separator while separating the first electrode plate, the second electrode plate and the separator from the case by a predetermined distance.

The support member may have a porous structure that allows mobile ions to move.

At least one surface of the support member may include an adhesive tape adhered thereto. The adhesive tape may be a porous tape allowing circulating ions to move.

The support member may have a bar shape.

The secondary battery may further include a prop member protruding perpendicular to the support member from one end of the support member.

The support member may have an area that gradually increases toward its protruding direction.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
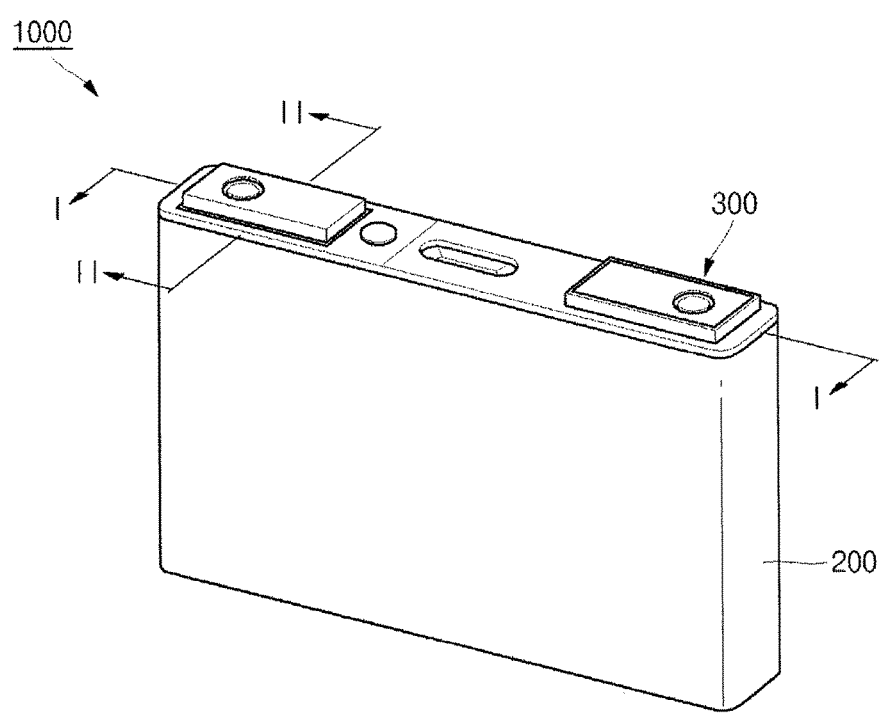
FIG. 1 illustrates an assembled perspective view of a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions may be exaggerated for clarity of illustration. Like reference numerals refer to like elements throughout.

Figure 2:
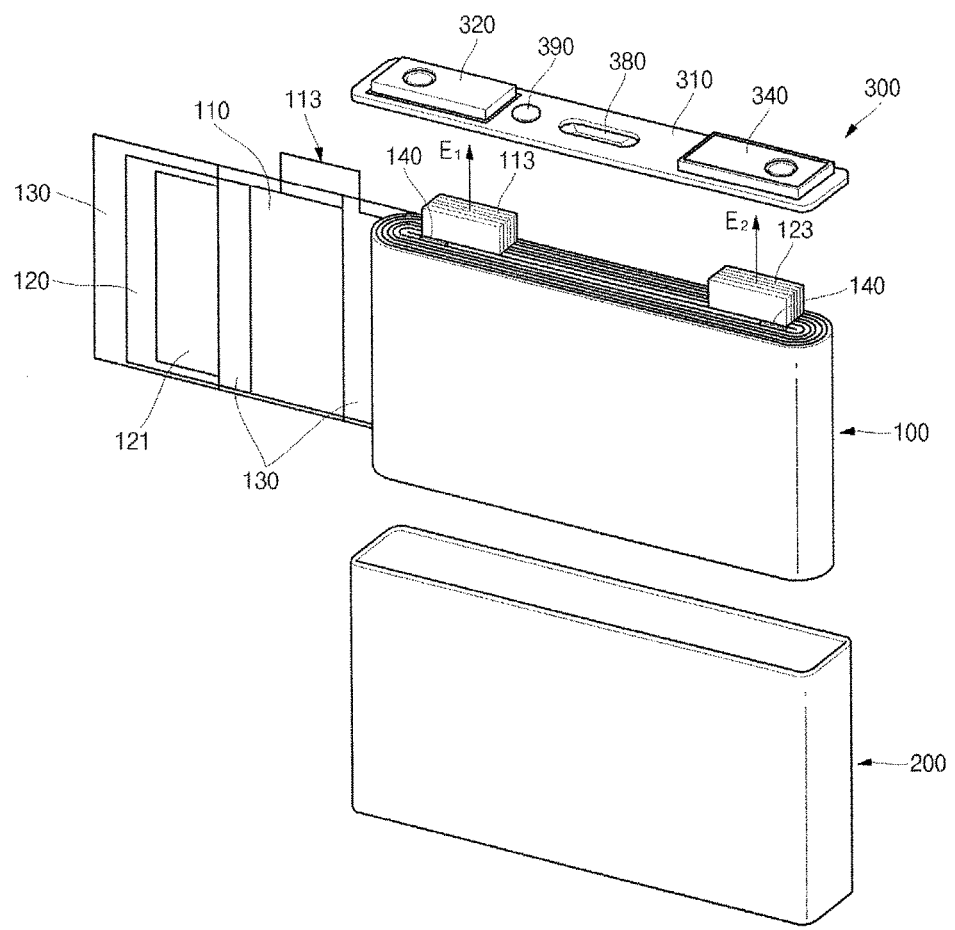
FIG. 2 illustrates an exploded perspective view of the secondary battery shown in FIG. 1.
Figure 3A:
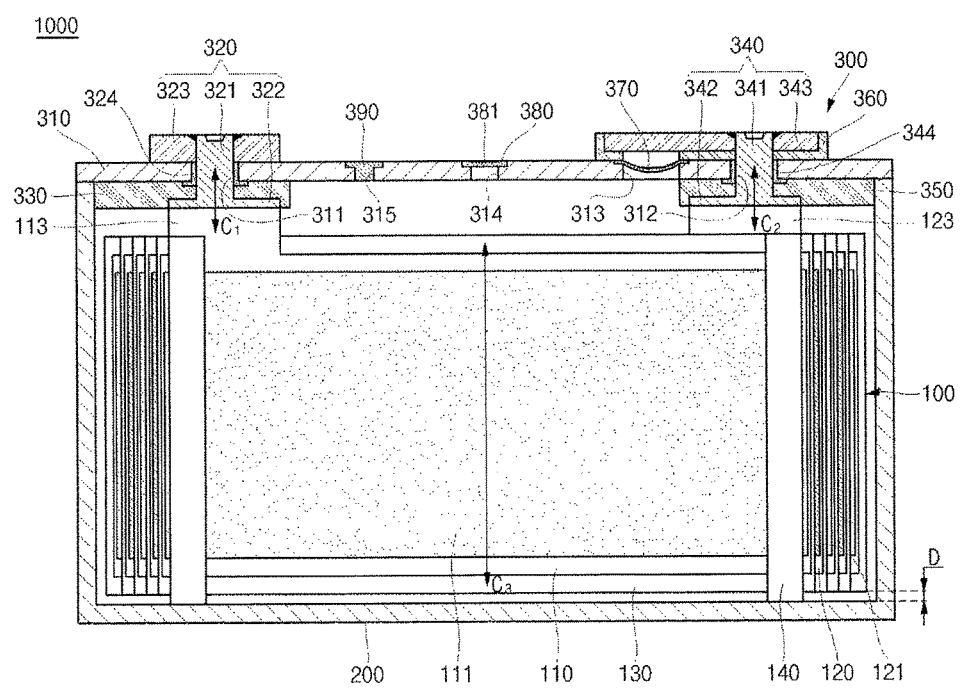
FIG. 3A illustrates a cross-sectional view taken along the line I-I' of FIG. 1.
Figure 3B:
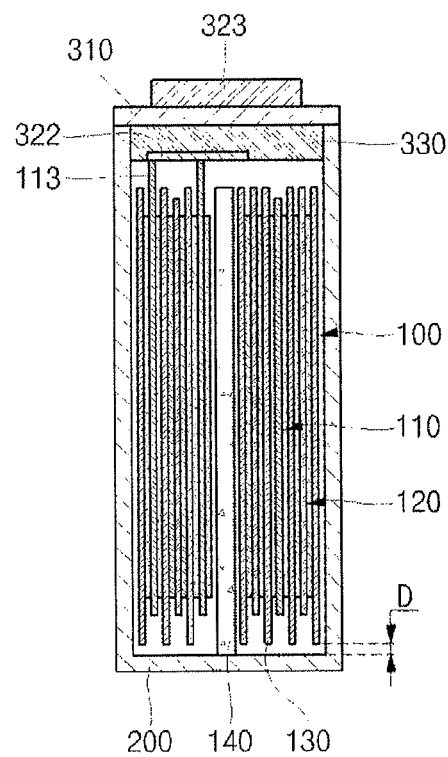
FIG. 3B illustrates a cross-sectional view taken along the line II-II' of FIG. 1.
Figure 3C:
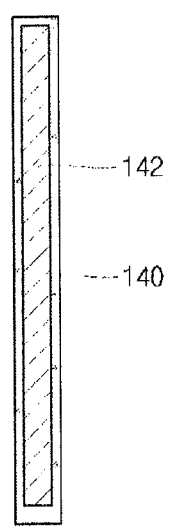
FIG. 3C illustrates a support member according to an embodiment.

FIG. 1 illustrates an assembled perspective view of a secondary battery according to an embodiment, FIG. 2 illustrates an exploded perspective view of the secondary battery shown in FIG. 1, and FIG. 3A illustrates a cross-sectional view taken along the line I-I' of FIG. 1, FIG. 3B illustrates a cross-sectional view taken along the line II-II' of FIG. 1, and FIG. 3C illustrates a support member according to an embodiment.

Referring to FIGS. 1 to 3C, the secondary battery 1000 according to an embodiment includes an electrode assembly 100, a case 200 and a cap assembly 300.

The electrode assembly 100 may include a first electrode plate 110, a second electrode plate 120, a separator 130 and a support member 140, which are formed as thin plates or layers. The first electrode plate 110 may function as a positive electrode and the second electrode plate 120 may function as a negative electrode, or vice versa.

The first electrode plate 110 may be formed by coating a first electrode active material 111, such as a transition metal oxide, on a first electrode collector formed of a metal foil of, for example, aluminum. A plurality of first lead tabs 113 that are not coated with the first electrode active material 111 may extend and protrude from the first electrode collector to the cap assembly 300. The first lead tabs 113 may be aligned at regular positions during a winding process for fabricating the electrode assembly 100, providing a multi-tab configuration. The first lead tabs 113 may serve as paths for the flow of current between the first electrode plate 110 and a first external polar element.

The second electrode plate 120 may be formed by coating a second electrode active material 121, such as graphite or carbon, on a second electrode collector formed of a metal foil of, for example, copper or nickel. A plurality of second lead tabs 123 that are not coated with the second electrode active material 121 may extend and protrude from the second electrode collector to the cap assembly 300. The second lead tabs 123 may be aligned at regular positions during a winding process for fabricating the electrode assembly 100, providing a multi-tab configuration. The second lead tabs 123 may serve as paths for the flow of current between the second electrode plate 120 and a second external polar element.

As shown in FIG. 2, the first lead tab 113 and the second lead tab 123 may be drawn from the first electrode plate 110 and the second electrode plate 120 in the same direction E1, E2 to then be electrically connected to the first electrode terminal 320 and the second electrode terminal 340 of the cap assembly 300, respectively, as described below. In addition, as shown in FIG. 3A, a direction C1 of an axis formed by the first lead tab 113 and the first electrode terminal 320 and a direction C2 of an axis formed by the second lead tab 123 and the second electrode terminal 340 may be parallel with a core axis direction C3 of the electrode assembly 100.

The separator 130 may be positioned between the first electrode plate 110 and the second electrode plate 120 to prevent short-circuits from occurring therebetween and to allow flowable ions to move. The separator 130 may have a width greater than that of the first electrode plate 110 or the second electrode plate 120 and may protrude upwardly and downwardly from the electrode assembly 110 farther than the first electrode plate 110 and the second electrode plate 120. On the other hand, the separator 130 may not protrude upwardly from the electrode assembly 110 farther than the first and second lead tabs 113 and 123 and may not protrude downwardly from the electrode assembly 110 further than the support member 140. The first and second lead tabs 113 and 123 may protrude upwardly from the electrode assembly 100 farther than the separator 130, and the support member 140 may protrude downwardly from the electrode assembly 100 farther than the separator 130.

The separator 130 may be made of polyethylene, polypropylene, or a combination of polyethylene and polypropylene, as examples.

The support member 140 may positioned between the first electrode plate 110 and the separator 130 or between the second electrode plate 120 and the separator 130. The support member 140 may be wound together with the first electrode plate 110, the second electrode plate 120 and the separator 130 to then be fixed to the electrode assembly 100. The support member 140 may have a bar shape and may have a bottom end protruding downwardly from the electrode assembly 100, thereby bearing the weight of the electrode assembly 100 from a bottom surface of the case 200 when the electrode assembly 100 is accommodated in the case 200. The separator 130 may be spaced a predetermined distance D apart from the bottom surface of the case 200 by the support member 140, such that the separator 130 is not brought into direct contact with the bottom surface of the case 200.

In the comparative electrode assembly accommodated in a case in a core axis, an outermost end of the separator comes into direct contact with a bottom surface of the case, thereby bearing the weight of the electrode assembly. However, in the embodiment, the support member 140 protruding from the electrode assembly 100 allows the electrode assembly 100 to be space a predetermined distance apart from the case 200 and bears the weight of the electrode assembly 100. Thus, it may be possible to prevent the separator 130 from being damaged due to the weight of the electrode assembly 100, thereby improving the structural stability of the separator 130.

The support member 140 may include a plurality of support members provided in the electrode assembly 100. In such a case, the position and number of the support members 140 may be selected so as to allow the electrode assembly 100 to maintain a balance within the case 200. For example, the position and number of the support members 140 may be selected such that the support members 140 are symmetrically arranged in view of the core axis of the electrode assembly 100. If more support members 140 than required were to be provided, contact areas between electrode active materials and the separator 130 could be excessively reduced, thereby lowering battery efficiency. If the support members 140 were to be asymmetrically arranged, the weight of the electrode assembly 100 may not be uniformly distributed to the respective support members 140 but may concentrate on a support member located at a particular position. According to embodiments, the support members 140 may be arranged to be horizontally symmetrical with each other in view of the core axis of the electrode assembly 100.

The support member 140 may be appropriately sized. For example, if the width and thickness of the support member 140 were to be unduly large, contact areas between electrode active materials and the separator 130 could be excessively reduced, thereby lowering battery efficiency. According to embodiments, the support member 140 may have a porous structure to allow mobile ions, such as lithium ions, to move. The support member 140 may be shaped as a frame having an opening to allow for the movement of mobile ions. In this case, however, the bearing capacity of the weight of the electrode assembly 100 may be reduced. Accordingly, the mobility of mobile ions and weight bearing capacity of the electrode assembly 100 may both be taken into consideration in fabricating the support member 140.

The support member 140 may be made of a hard material so as to maintain a predetermined distance D between the separator 130 and the bottom surface of the case 200. In addition, the support member 140 may be made of an insulating material so as to achieve insulation stability of the secondary battery 1000.

As shown in FIG. 3C, an adhesive tape 142 may be formed on at least one surface of the support member 140. The adhesive tape 142 may allow the support member 140 to be fixed well to the electrode assembly 100. If the support member 140 has a porous structure, the adhesive tape 142 may also have porosity to allow mobile ions, such as lithium ions, to move. In other implementations, the adhesive tape 142 may include a plurality of adhesive tapes so as to minimize an adhesion area.

The electrode assembly 100 may be housed in the case 200 with an electrolyte solution. The electrolyte solution may include an organic solvent such as ethylene carbonate (EC), propylene carbonate (PC), diethyl carbonate (DEC), ethylmethyl carbonate (EMC), dimethyl carbonate (DMC), or the like, and a lithium salt such as $LiPF_6$ or $LiBF_4$. The electrolyte solution may be a liquid, a solid or a gel phase.

The case 200 may be made of a conductive metal such as aluminum, aluminum alloy or nickel plated steel, and may have an approximately hexagonal shape that defines an opening through which the electrode assembly 100 is inserted and placed in the case 200. The case 200 may have an inner surface subjected to an insulating treatment to be insulated from the electrode assembly 100.

The cap assembly 300 may be coupled to the case 200. The cap assembly 300 may include a cap plate 310, a first electrode terminal 320, a first lower insulation member 330, a second electrode terminal 340, a second lower insulation member 350, an upper insulation member 360, a short-circuit plate 370, a safety vent 380 and a plug 390.

The cap plate 310 may seal the opening of the case 200 and may be made of the same material as the case 200. The cap plate 310 may include a first electrode terminal hole 311, a second electrode terminal hole 312, a short-circuit hole 313, a vent hole 314, and an electrolyte injection hole 315. The cap plate 310 may be coupled to the case 200 by laser welding.

The first electrode terminal 320 may include a first electrode terminal member 321, a first electrode plate 322, a first terminal plate 323 and a first seal gasket 324. The first electrode terminal member 321 may pass through the first electrode terminal hole 311 and may have a lower portion connected to the first electrode plate 322 and an upper portion connected to the first terminal plate 323. The upper portion of the first electrode terminal member 321 may be fitted into a coupling hole of the first terminal plate 323 to be riveted and coupled to the first terminal plate 323. A bottom surface of the first electrode plate 322 may be welded to the first lead tab 113 to then be electrically connected to the first electrode plate 110. The first seal gasket 324 may be made of an insulating material and may seal a gap between the first electrode terminal member 321 and the first electrode terminal hole 311.

The first lower insulation member 330 may be positioned between the cap plate 310 and each of the first electrode terminal member 321 and the first electrode plate 322 and may prevent unnecessary short-circuits from occurring therebetween.

The second electrode terminal 340 may include a second electrode terminal member 341, a second electrode plate 342, a second terminal plate 343, and a second seal gasket 344. The second electrode terminal member 341 may pass through the second electrode terminal hole 312 and may have a lower portion connected to the second electrode plate 342 and an upper portion connected to the second terminal plate 343. The upper portion of the second electrode terminal member 341 may be fitted into a coupling hole formed at one side of the second terminal plate 343 to be riveted and coupled to the second terminal plate 343. The other side of the second terminal plate 343 may extend to a position corresponding to the short-circuit hole 313. A bottom surface of the second electrode plate 342 may be welded to the second lead tab 123 to be electrically connected to the second electrode plate 120. The second seal gasket 344 may be made of an insulating material and may seal a gap between the second electrode terminal member 341 and the second electrode terminal hole 312.

The second lower insulation member 350 may be positioned between the cap plate 310 and each of the second electrode terminal member 341 and the second electrode plate 342, thereby preventing short-circuits from occurring therebetween.

The upper insulation member 360 may be formed to surround side and bottom portions of the second terminal plate 343 and may insulate the second terminal plate 343 from the cap plate 310. An opening corresponding to the short-circuit hole 313 may be formed on a bottom surface of the upper insulation member 360.

The short-circuit plate 370 may be installed in the short-circuit hole 313 of the cap plate 310 to have the same polarity with the cap plate 310. When the internal pressure of the secondary battery 1000 exceeds a preset pressure, the short-circuit plate 370 may be inverted and may protrude convexly upward to be brought into contact with a bottom surface of the other side of the second terminal plate 343, resulting in occurrence of a short-circuit. If the short-circuit occurs, the amount of current flowing in the secondary battery 1000 increases to generate heat, and a fuse (not shown) may be melted by the generated heat, thereby interrupting the flow of current through the secondary battery 1000.

The safety vent 380 may be installed in the vent hole 314 of the cap plate 310 and may have a notch 381 configured to be opened at a preset pressure.

The plug 390 may be installed to seal the electrolyte injection hole 315 of the cap plate 310.

The first electrode plate 322 and the first lead tab 113 may be coupled to each other, and the second electrode plate 342 and the second lead tab 123 are coupled to each other, thereby allowing the first and second electrode terminals 320 and 340 to share the capacity of bearing the weight of the electrode assembly 100 and supporting the electrode assembly 100.

Figure 4A:
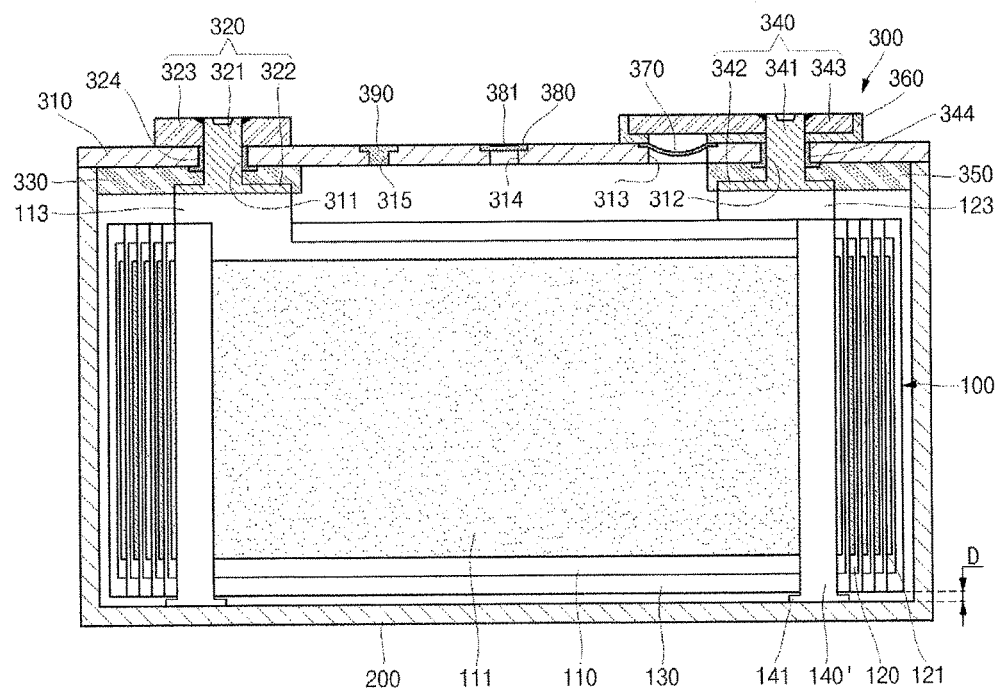
FIGS. 4A to 4C illustrate a secondary battery according to a modified embodiment.
Figure 4B:
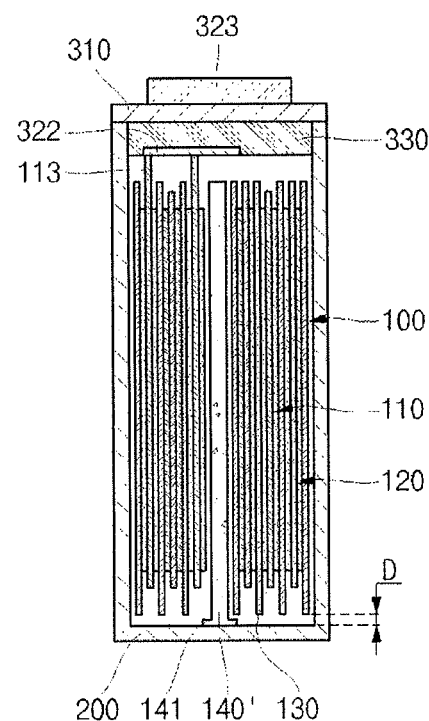
Figure 4C:
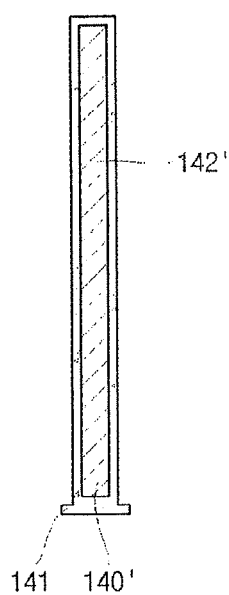

FIGS. 4A to 4C illustrate a secondary battery according to a modified embodiment.

The secondary battery shown in FIGS. 4A to 4C is substantially the same with the secondary battery 1000 shown in FIGS. 1 to 3C, except for a configuration of a support member 140'. In FIGS. 4A to 4C, the same functional components are denoted by the same reference numerals with those of the previous embodiment, and detailed descriptions thereof will not be repeated.

According to the modified embodiment, the support member 140' may further include a prop member 141 connected to a bottom end contacting a bottom surface of a case 200. The prop member 141 may have a roughly plate-like shape and may be positioned to be perpendicular to the support member 140'. The prop member 141 may be provided for reinforcing the bearing capacity of the support member 140' against the weight of the electrode assembly 100. The prop member 141 may be made of the same material as the support member 140'. As shown in FIG. 4C, an adhesive tape 142' may be adhered to the support member 140'. Other details of the support member 140' may be understood by referring to the aforementioned support member 140.

Figure 5A:
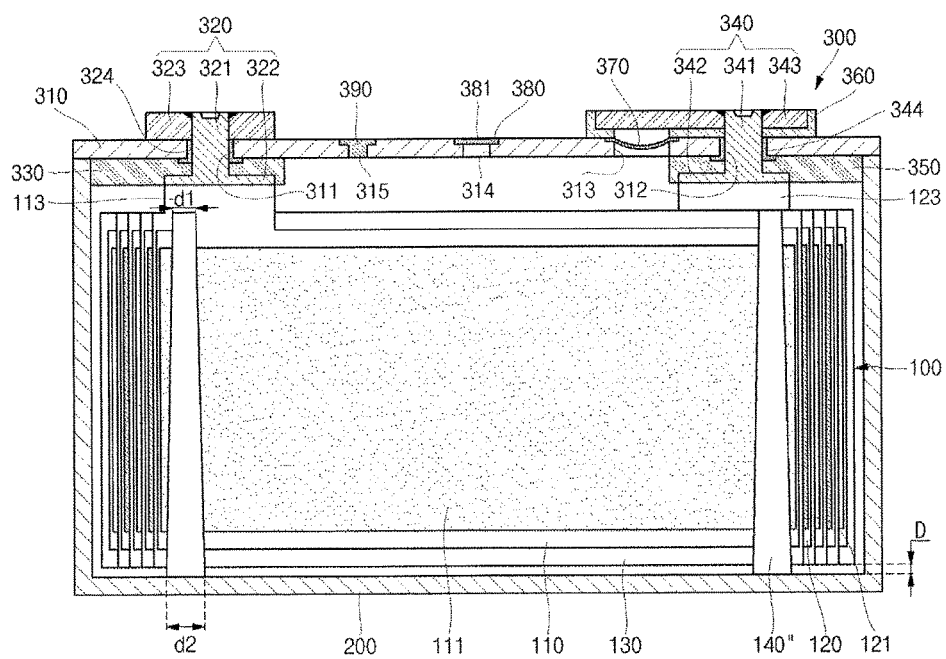
FIGS. 5A to 5C illustrate a secondary battery according to another modified embodiment.
Figure 5B:
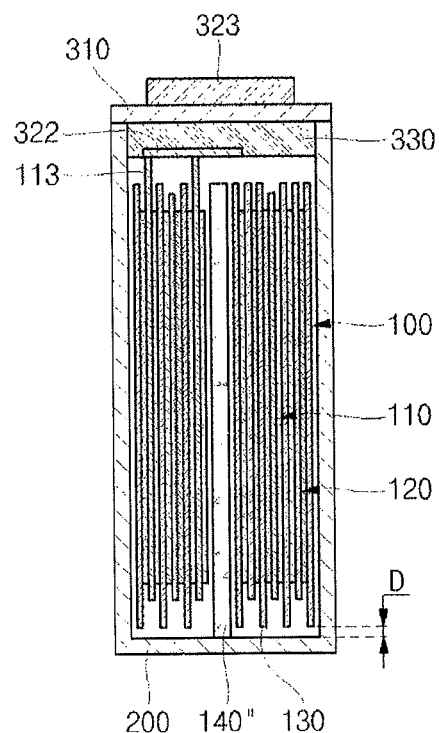
Figure 5C:
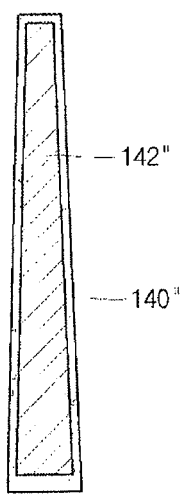

FIGS. 5A to 5C illustrate a secondary battery according to another modified embodiment.

The secondary battery shown in FIGS. 5A to 5C may be substantially the same as the secondary battery 1000 shown in FIGS. 1 to 3C, except for a configuration of a support member 140". In FIGS. 5A to 5C, the same functional components are denoted by the same reference numerals with those of the previous embodiment, and detailed descriptions thereof will not be repeated.

According to this modified embodiment, the support member 140" may have an area that gradually increases toward a lower portion of the electrode assembly 100, that is, in a protruding direction of the electrode assembly 100. For example, as shown in FIG. 5A, the support member 140" may be shaped as a trapezoid having a lower width d2 greater than an upper width d1. With this configuration, the support member 140" may have an increased bearing capacity against the weight of the electrode assembly 100. In addition, as shown in FIG. 5C, an adhesive tape 142" may be adhered to the support member 140". Other details of the support member 140" may be understood by referring to the aforementioned support member 140.

Figure 6:
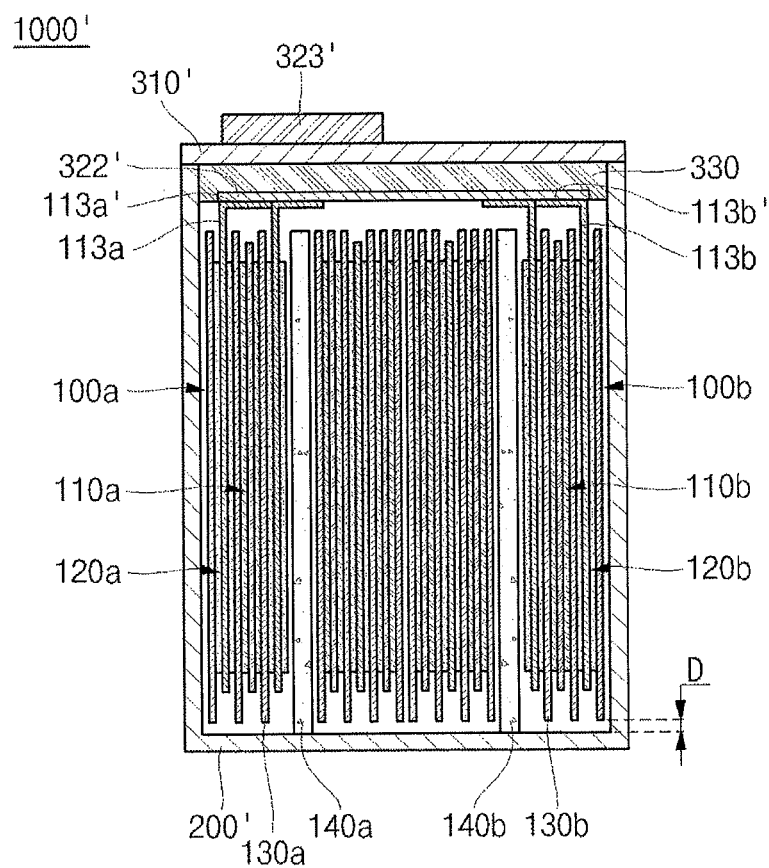
FIG. 6 illustrates a cross-sectional view of a secondary battery according to another embodiment.

FIG. 6 illustrates a cross-sectional view of a secondary battery according to another embodiment.

Referring to FIG. 6, the secondary battery 1000' according to this embodiment may include a pair of first and second electrode assemblies 100a and 100b disposed to face each other. As described above, unlike in the secondary battery 1000 according to the previous embodiment, including one electrode assembly 100, in the secondary battery 1000' including a plurality of electrode assemblies 100a and 100b, lead tabs drawn from the respective electrode assemblies 100a and 100b may be disposed to face each other. For example, as shown in FIG. 6, the first lead tab 113a of the first electrode assembly 100a and the first lead tab 113b of the second electrode assembly 100b may be disposed to face each other. The first lead tab 113a may include a first bent portion 113a' having an upper portion that is bent, and the second lead tab 113b may include a second bent portion 113b' having an upper portion that is bent. The first and second bent portions 113a' and 113b' may be bent to face each other and may be electrically connected to the first electrode plate 322'.

In other aspects, the secondary battery 1000' according to the present embodiment may be substantially the same as the secondary battery 1000 according to the previous embodiment in view of configurations, and detailed descriptions thereof will not be repeated.

The embodiments have been described with regard to the secondary battery for use in an automotive vehicle by way of example. In other implementations, embodiments may also be applied to any type of secondary battery having an electrode assembly accommodated in a case in a core axis direction.

By way of summation and review, secondary batteries are classified into a lead storage battery, a Ni—Cd battery, a Ni-MH battery, a lithium ion battery, a lithium polymer battery, and so on. Specifically, the lithium ion battery or the lithium polymer battery provide a high energy density per unit weight than other kinds of batteries, such that they can be rapidly applied for use in portable IT devices.

The recent trend toward growth in the use of secondary batteries for electric vehicles, has made it desirable for the secondary battery to have advantageous characteristics such as a high density, high output and stability.

An electrode assembly of the lithium ion battery or the lithium polymer battery includes a positive electrode plate, a negative electrode plate and a separator. The positive electrode plate is formed by coating a lithium-based positive electrode active material on an aluminum base and the negative electrode plate is formed by coating a carbonaceous negative electrode active material on a copper base. The separator may separate the positive electrode plate and the negative electrode plate from each other and may be formed of a polymer material having actively moving ions.

The lithium ion battery or the lithium polymer battery may be fabricated in a cylindrical, prismatic or pouch type. A secondary battery, such as a secondary battery for use in an automotive vehicle, may be fabricated such that an electrode assembly is housed in a prismatic can. As indicated, for this and other uses, a high capacity and high output characteristics are desirable. In order to fabricate a high-capacity secondary battery, it is desirable to wind electrode plates coated with as much positive/negative electrode active materials as possible in a given volume of the can. To this end, a secondary battery may be configured to accommodate as many as electrode plates as possible in a given volume of a can by directly connecting the electrode plates to electrode terminals without an electrode assembly.

In order to connect the electrode plates of an electrode assembly to the electrode terminals, the electrode assembly may be configured to be inserted into the can toward a core axis of the electrode assembly. In such a case, an end of a separator may be brought into contact with a bottom surface of the can to bear the weight of the electrode assembly. Since the weight derived from the electrode plates and active materials is directly applied to the separator, structural stability of the electrode assembly may be adversely affected. In addition, the weight derived from the electrode plates and active materials may also be applied to connected portions between the electrode plates and the electrode terminals, and the structural stability of the electrode assembly may also be adversely affected by the weight.

Embodiments provide an electrode assembly having improved structural safety by assembling a support member for bearing the weight of the electrode assembly, electrode plates and a separator by being wound together, and a secondary battery having the electrode assembly. According to embodiments, a support member for bearing the weight of the electrode assembly, electrode plates and a separator are wound together and assembled, thereby providing an electrode assembly having improved structural safety and a secondary battery having the electrode assembly.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. An electrode assembly, comprising:
a first electrode plate having a first electrode active material coated on at least one surface thereof;
a second electrode plate having a second electrode active material coated on at least one surface thereof;
a separator between the first electrode plate and the second electrode plate;
a plurality of lead tabs drawn in a same direction from the first electrode plate and the second electrode plate, respectively; and
at least one support member between the first electrode plate and the separator, the at least one support member protruding from the electrode assembly at an opposite end of the electrode assembly from the plurality of lead tabs, the at least one support member outwardly protruding from the opposite end of the electrode assembly farther than an outermost end of the separator, and the support member having a porous structure that allows mobile ions to move.

2. The electrode assembly as claimed in claim 1, wherein when the electrode assembly is housed in a case, the support member contacts an internal surface of the case and supports the first electrode plate, the second electrode plate and the separator while separating the first electrode plate, the second electrode plate and the separator from the case by a predetermined distance.

3. The electrode assembly as claimed in claim 1, wherein at least one surface of the support member includes an adhesive tape adhered thereto, the adhesive tape being a porous tape allowing circulating ions to move.

4. The electrode assembly as claimed in claim 1, wherein an adhesive tape is adhered to at least one surface of the support member.

5. The electrode assembly as claimed in claim 1, wherein the support member has a bar shape.

6. The electrode assembly as claimed in claim 5, further including a prop member protruding perpendicular to the support member from one end of the support member.

7. The electrode assembly as claimed in claim 5, wherein the support member has an area that gradually increases toward its protruding direction.

8. A secondary battery, comprising:
an electrode assembly including a first electrode plate, a second electrode plate, a separator between the first electrode plate and the second electrode plate and at least one support member between the first electrode plate and the separator;
a case accommodating the electrode assembly, the case including an open top end sealed by a cap assembly and a bottom end opposite from the top end, the bottom end including an internal surface; and
electrode terminals electrically connected to the electrode assembly,
wherein one end of the at least one support member outwardly protrudes from an end of the separator facing the bottom end of the case and contacts the internal surface at the bottom end of the case, wherein the support member has a porous structure that allows mobile ions to move.

9. The secondary battery as claimed in claim 8, further comprising a plurality of lead tabs drawn in a same direction from the first electrode plate and the second electrode plate and electrically connected to the electrode terminals, respectively.

10. The secondary battery as claimed in claim 9, wherein directions of axes formed by the electrode terminals and the lead tabs are parallel with a core axis direction of the electrode assembly.

11. The secondary battery as claimed in claim 9, wherein the electrode assembly includes a plurality of electrode assemblies, the lead tabs drawn from the plurality of electrode assemblies are arranged to face each other and include bent portions facing each other, the bent portions being electrically connected to the electrode terminals.

12. The secondary battery as claimed in claim 8, wherein the support member supports the first electrode plate, the second electrode plate and the separator while separating the first electrode plate, the second electrode plate and the separator from the case by a predetermined distance.

13. A secondary battery, comprising:
an electrode assembly including a first electrode plate, a second electrode plate, a separator between the first electrode plate and the second electrode plate and at least one support member between the first electrode plate and the separator;
a case accommodating the electrode assembly; and
electrode terminals electrically connected to the electrode assembly,
wherein:
one end of the support member outwardly protrudes from an outermost end of the separator and contacts an internal surface of the case, and
the support member has a porous structure that allows mobile ions to move.

14. The secondary battery as claimed in claim 13, wherein at least one surface of the support member includes an adhesive tape adhered thereto, the adhesive tape being a porous tape allowing circulating ions to move.

15. The secondary battery as claimed in claim 8, wherein an adhesive tape is adhered to at least one surface of the support member, the adhesive tape being a porous tape allowing mobile ions to move.

16. The secondary battery as claimed in claim 8, wherein the support member has a bar shape.

17. The secondary battery as claimed in claim 16, further including a prop member protruding perpendicular to the support member from one end of the support member.

18. The secondary battery as claimed in claim 16, wherein the support member has an area that gradually increases toward its protruding direction.

* * * * *